March 11, 1947.  T. T. SHORT  2,417,272
POWER SUPPLY AND VOLTAGE LIMITER
Filed Sept. 6, 1944

Inventor:
Thomas T. Short,
by Harry E. Dunham
His Attorney.

Patented Mar. 11, 1947

2,417,272

UNITED STATES PATENT OFFICE 2,417,272

POWER SUPPLY AND VOLTAGE LIMITER

Thomas T. Short, Fort Wayne, Ind., assignor to General Electric Company, a corporation of New York Application September 6, 1944, Serial No. 552,867

9 Claims. (Cl. 171—97)

This invention relates to regulator circuits and more particularly to an improved voltage regulator circuit for systems having a load which varies intermittently between no load and a substantially constant full load value.

The invention is characterized by the use of matched circuit impedances, the connections of one of which are controlled simultaneously, or substantially simultaneously, with the changes in the connections of the load.

An object of the invention is to provide a new and improved regulator circuit.

Another object of the invention is to provide a simple and inexpensive voltage regulator circuit.

The invention will be better understood from the following description taken in connection with the accompanying drawing and its scope will be pointed out in the appended claims.

Figure 1:
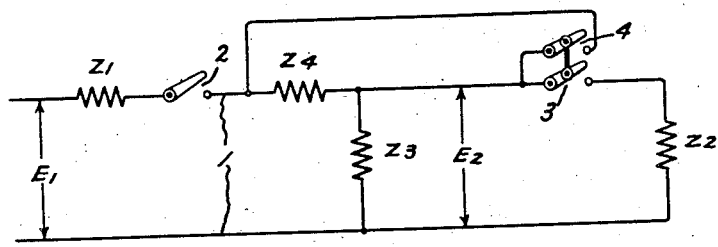
Figure 2:
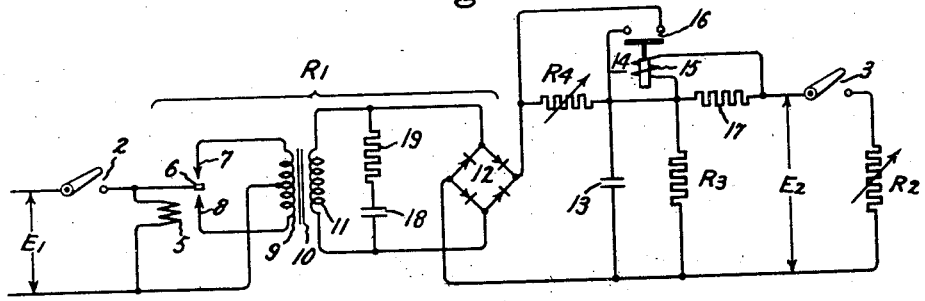

In the drawing Fig. 1 illustrates diagrammatically a simplified circuit embodying the invention and Fig. 2 is a similar illustration of a particular application of the invention.

Referring now to the drawing and more particularly to Fig. 1, there is shown therein a circuit 1 having a source end across which an applied voltage E1 may selectively be impressed by means of a switch 2. The source of current supply has an internal impedance which is represented by Z1 and which causes its effective voltage to decrease as the current it delivers increases. Circuit 1 also has a load end across which a load Z2 may be selectively connected by means of a switch 3.

The voltage regulating elements include a pair of impedances Z3 and Z4, Z3 being in effect a shunt impedance and Z4 being in effect a series impedance, Z4 being connected in series in the circuit on the source side of Z3. An auxiliary set of contacts 4 on switch 3 serves to short circuit Z4 when the switch is closed so as to connect the load Z2 across the circuit.

I have found that if the ratio of Z4 to Z3 is made equal to the ratio of Z1 to Z2, then the voltage E2 across the load end of the circuit will be the same with the switch 3 open as with the switch 3 closed.

It should be understood that the impedance symbol Z stands for resistance or reactance or both and that reactance is either inductive or capacitive or both.

In Fig. 2 the principles of Fig. 1 have been applied to a vibratory inverter circuit for supplying current to a radio transmitter which is to be keyed. In this figure the supply voltage is a direct-current voltage which is impressed across a driving coil 5 for a vibratory inverter through the switch 2. The driving coil operates a vibrating contact member 6 which alternately engages fixed contacts 7 and 8 connected to opposite terminals of the primary winding 9 of a voltage step-up transformer 10. One side of the current source is connected to the vibrating contact 6 and the other is connected to the mid-point of the primary winding 9.

The secondary winding 11 of the transformer 9 is connected to the input of a rectifier 12 whose output terminals are connected to a load circuit, the load on which is represented by a resistor R2 which is selectively connected to and disconnected from the circuit by switch 3. A filter capacitor 13 is connected across the output of the rectifier for filtering out high frequency pulsations. A bleeder resistor R3 is connected in parallel with the capacitor 13 for providing open circuit protection, that is, it discharges the capacitor 13 when the switch 2 is open. R3 normally dissipates about 2 or 3 per cent of the full load watts. A resistor R4 is connected in the output circuit of the rectifier 12 on the current supply side of the bleeder resistor R3 and a relay 14, having an operating coil 15 connected in the direct-current load circuit on the load side of the filter capacitor 13, is arranged to control the connections of R4. This is a normally open relay having a set of contacts 16 which are closed when load current flows through the winding 15. A protective resistor 17 for the relay coil is connected across this coil. However, the resistance of coil 15 and resistor 17 in parallel is negligible in comparison with the effective load resistance R2. The secondary winding 11 of the transformer 10 is shunted by a buffer capacitor 18 and a series resistor 19 for limiting the in-rush current of the capacitor 18.

The over-all effective resistance of the source of current supply, the inverter, the transformer 10 and the rectifier 12 has a value R1; in other words, if the output current of the rectifier is I amperes, the output voltage of the rectifier is I.R1 volts less than E1.

R1, R2, R3 and R4 are related in the same manner that Z1, Z2, Z3 and Z4 are related in Fig. 1 so that R4 is made equal to R1R3/R2. This resistor R4 is preferably made adjustable so that its value can be changed for different load values of R2.

The operation of Fig. 2 is as follows: When switch 2 is closed the resulting energization of coil 5 pulls contact 6 into engagement with contact 8, thereby causing current to flow in one direction through one-half of the primary winding 9 and also short circuiting the coil 5. The contact 6 then springs back and at the limit of its rebound strikes contact 7, thereby causing current to flow through the other half of the winding 9 in the opposite direction. Coil 5 is now re-energized and thus attracts contact 6 toward contact 8 so that the cycle is repeated and thus alternating current flows in the winding 9 thus inducing an alternating voltage in the winding 11 which is rectified by the rectifier 12, filtered by the capacitor 13 and the filtered current passed on to the load end of the circuit.

The buffer capacitor 18 serves to limit the inrush current of the vibrating contacts. The filter capacitor 13 is charged up to the output voltage of the rectifier.

If now the load controlling switch 3 is closed the filter capacitor 13 will immediately tend to discharge into the load through the relay coil 15, thus causing this relay to pick up and close its contacts 16, thereby short circuiting R4 so that the load current is now all supplied from the rectifier 12. When the switch 3 is opened the contacts 16 of course open due to the interruption of load current through the operating coil 15 on the relay 14 so that R4 is reinserted in the circuit. Because of the relative proportions of R1, R2, R3 and R4 the voltage drop across R3 when R1, R3 and R4 are in series, namely when switch 1 is open, is exactly the same as the voltage drop across R2 and R3 in parallel when switch 3 is closed and the load current flows through R1 but not through R4 because the latter is short circuited.

The reason that most of the load current is supplied initially by the capacitor 13 when switch 3 is closed is because R4 has a relatively high value and this in turn is because R3 has a relatively very high value in comparison with R1 and R2. One effect of this action is that there will be a momentary dip in voltage when the load is applied and a momentary rise in voltage when the load is removed. In order to reduce this dip or transient to a satisfactory value capacitor 13 must be sufficiently large and the operation of relay 14 must be sufficiently fast. In this connection it will be noted that the presence of the load resistance R2 in series with the operating coil 15 of the relay will increase the operating speed of this relay because the time constant of its circuit is proportional to L/R and R2 increases the value of R in the time constant. In addition to having the relay 14 fast acting its contacts should also be insulated so as to be able to withstand the full value of the supply voltage E1 because this voltage will be momentarily impressed across them when the switch 2 is closed. This is due to the fact that all of the voltage is across R4 until capacitor 13 is charged. After capacitor 13 becomes charged the operating voltage for the contacts 16 will be equal to the regulation of the power supply, that is to say, the voltage drop across R1. This of course assumes that the power supply switch 2 is closed before the load switch 3 is closed.

Considerable difficulty has been experienced in the past with vibratory inverters when the supply switch is turned on. This is believed to be due to the fact that the filter capacitor draws a very high initial charging current, thereby overloading the vibrator. It will be noted in Fig. 2 that the high resistance R4 is in series with capacitor 13 and therefore the initial charging current of this capacitor is limited to a very low value. This protects the inverter contacts and is a distinct advantage of the circuit shown in Fig. 2.

While there have been shown and described particular embodiments of the invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent in the United States is:

1. In combination, an electric circuit having a source end and a load end, a substantially constant voltage source of current supply having an impedance Z1 connected to the source end of said circuit, a load having an impedance Z2, means for selectively connecting said load across the load end of said circuit and disconnecting it therefrom, and means for equalizing the no load and full load voltages of the load end of said circuit comprising a pair of impedances, one of said pair of impedances being a shunt impedance Z3 permanently connected across said circuit, the other of said pair of impedances being a series impedance Z4 which carries the current of Z3 and which is short circuited at full load, the relative values of said impedances being such that $$\frac{Z1}{Z2} = \frac{Z4}{Z3}$$

2. In combination, an electric circuit having a source end and a load end, a substantially constant voltage source of current supply having an impedance Z1 connected to the source end of said circuit, a load having an impedance Z2, means for selectively connecting said load across the load end of said circuit and disconnecting it therefrom, means for equalizing the no load and full load voltages of the load end of said circuit comprising a pair of impedances, one of said pair of impedances being a shunt impedance Z3 permanently connected across said circuit, the other of said pair of impedances being a series impedance Z4 on the source side of said shunt impedance, and a normally open relay responsive to load current for short circuiting said series impedance Z4, the relative values of said impedances being such that $$\frac{Z1}{Z2} = \frac{Z4}{Z3}$$

3. In combination, an electric circuit having a source end and a load end, a substantially constant voltage source of current supply having an impedance Z1 connected to the source end of said circuit, a load having an impedance Z2, means for selectively connecting said load across the load end of said circuit and disconnecting it therefrom, means for equalizing the no load and full load voltages of the load end of said circuit comprising a pair of impedances, one of said pair of impedances being a shunt impedance Z3 permanently connected across the load end of said circuit, the other of said pair of impedances being a series impedance Z4, a normally open relay responsive to load current for short circuiting said series impedance Z4, the relative values of said impedances being such that $$\frac{Z1}{Z2} = \frac{Z4}{Z3}$$

and a capacitor connected in parallel with the shunt impedance Z3.

4. In combination, an electric circuit having a source end and a load end, a substantially constant voltage source of current supply having an equivalent resistance R1 connected to the source end of said circuit, a load having a resistance R2, means for selectively connecting said load across the load end of said circuit and disconnecting it therefrom, and means for equalizing the no load and full load voltages of the load end of said circuit comprising a pair of resistors, one of said pair of resistors being a shunt resistor R3 permanently connected across said circuit near the load end thereof, the other of said pair of resistors being a series resistor R4 which is short circuited at full load, the relative values of said resistors being such that $$\frac{R1}{R2}=\frac{R4}{R3}$$

5. In combination, an electric circuit having a source end and a load end, a substantially constant voltage source of current supply having an equivalent resistance R1 connected to the source end of said circuit, a load having a resistance R2, means for selectively connecting said load across the load end of said circuit and disconnecting it therefrom, means for equalizing the no load and full load voltages of the load end of said circuit comprising a pair of resistors, one of said pair of resistors being a shunt resistor R3 permanently connected across the load end of said circuit, the other of said pair of resistors being a series resistor R4, and a normally open relay responsive to load current for short circuiting said series resistor R4, the relative values of said resistances being such that $$\frac{R1}{R2}=\frac{R4}{R3}$$

6. In combination, an electric circuit having a source end and a load end, a substantially constant voltage source of current supply having an equivalent resistance R1 connected to the source end of said circuit, a load having a resistance R2, means for selectively connecting said load across the load end of said circuit and disconnecting it therefrom, means for equalizing the no load and full load voltages of the load end of said circuit comprising a pair of resistors, one of said pair of resistors being a shunt resistor R3 permanently connected across the load end of said circuit, the other of said pair of resistors being a series resistor R4, a normally open relay responsive to load current for short circuiting said series resistor R4, the relative values of said resistors and resistances being such that $$\frac{R1}{R2}=\frac{R4}{R3}$$

and a capacitor connected in parallel with the shunt resistor R3 for providing the initial load current impulse for operating said relay when said load is connected across the load end of said circuit.

7. An electric circuit having, in combination, a source end and a load end, said source end being adapted to be connected across a source of pulsating unidirectional voltage having an equivalent resistance R1, said load end being adapted to be selectively connected to and disconnected from a load having an equivalent resistance R2, a filter capacitor connected across said circuit, a bleeder resistor connected across said filter capacitor, said bleeder resistor having a relatively high ohmic value R3, a regulating resistor connected in said circuit on the source side of said bleeder resistor, said regulating resistor having a resistance R4 such that $$R4=\frac{R1R3}{R2}$$

a regulating relay having an operating coil connected in said circuit on the load side of said filter capacitor, and a normally open set of contacts on said relay connected across said regulating resistor, said relay acting to close said contacts when load current flows through said operating coil.

8. In combination, a vibratory inverter, a transformer for stepping up the output voltage of said inverter, a rectifier for converting the output of said transformer to direct current, the output voltage of said rectifier having a regulation with load current due to the impedance of the rectifier-transformer-inverter-power source, said impedance having an overall equivalent resistance R1, a load having a resistance R2, switching means for selectively connecting said load across the output of said rectifier, a filter capacitor and a bleeder resistor connected in parallel across the output of said rectifier, said bleeder resistor having a value R3, a regulating resistor connected in series with the output of said rectifier between said rectifier and said bleeder resistor, said regulating resistor having a value of R4 such that $$R4=\frac{R1R3}{R2}$$

and a regulating relay having a pair of normally open contacts connected across said regulating resistor, said regulating relay having an operating coil connected in series with the output of said rectifier on the load side of said filter capacitor, said relay being arranged to close its contacts when load current flows through its operating coil.

9. In combination, an electric supply circuit, a primary load, means for selectively connecting said primary load across said circuit and disconnecting it therefrom, an auxiliary load of negligible load value compared with said primary load connected across said load circuit when said primary load is disconnected therefrom, an impedance, and means for inserting said impedance serially in said supply circuit when said primary load is disconnected therefrom and effectively removing said impedance from said supply circuit when said primary load is connected thereacross, the value of said impedance being such that the regulation of said supply circuit when said primary load is connected thereacross and said impedance is effectively removed is the same as when said primary load is disconnected and said impedance is inserted therein.

THOMAS T. SHORT.

REFERENCES CITED

The following references are of record in the file of this patent:

UNITED STATES PATENTS

| Number | Name | Date |
|---|---|---|
| 347,025 | Brush | Aug. 10, 1886 |
| 2,015,556 | Fountain | Sept. 25, 1935 |